United States Patent
Willis

[11] 4,126,816
[45] Nov. 21, 1978

[54] HIGH VOLTAGE PROTECTION CIRCUIT

[75] Inventor: Donald H. Willis, Indianapolis, Ind.

[73] Assignee: RCA Corporation, New York, N.Y.

[21] Appl. No.: 796,669

[22] Filed: May 13, 1977

[51] Int. Cl.² .............................................. H01J 29/70
[52] U.S. Cl. .................................... 315/411; 358/190; 358/243
[58] Field of Search ................ 315/411, 383; 358/190, 358/243

[56] References Cited

U.S. PATENT DOCUMENTS

| | | | |
|---|---|---|---|
| 3,535,445 | 10/1970 | Griffery | 358/190 |
| 3,879,649 | 4/1975 | Durecka | 315/411 |
| 4,047,078 | 9/1977 | Meehan | 315/411 |

*Primary Examiner*—Theodore M. Blum

*Attorney, Agent, or Firm*—Eugene M. Whitacre; Paul J. Rasmussen; Joseph Laks

[57] ABSTRACT

A high voltage protection system comprises a deflection winding, a deflection circuit for providing scanning current to the deflection winding, a high voltage circuit for providing a high voltage accelerating potential for beam current, and a beam current sensing circuit for providing a beam current signal representative of the beam current. A high voltage protection circuit is coupled to the deflection circuit and is responsive to the high voltage accelerating potential for disabling normal deflection circuit operation when the high voltage accelerating potential exceeds first predetermined values. A coupling apparatus is responsive to the beam current signal and couples a signal to the protection circuit when the beam current decreases to less than a given value for changing the magnitudes of the first predetermined values.

11 Claims, 4 Drawing Figures

HIGH VOLTAGE PROTECTION CIRCUIT

BACKGROUND OF THE INVENTION

This invention relates to high voltage protection circuits for television receivers.

In television receivers, the ultor high voltage accelerating potential for beam current in many instances is derived from a voltage developed across a tertiary winding of a horizontal output transformer. In transistorized deflection circuits, the high voltage is a function of such factors as the regulated B+ operating voltage, the values of the resonant retrace circuit, and the internal impedance of the output transformer and the high voltage rectification and multiplication circuits. The magnitudes of the high voltage will vary as beam current is being drawn by the cathode ray tube, the high voltage increasing relatively sharply for beam current decrements at low beam current levels.

To protect against the generation of harmful X-radiation, receiver circuits may include a high voltage protection circuit. The protection circuit senses the high voltage with a voltage developed across a secondary winding of the horizontal output transformer and disables normal receiver operation should the high voltage increase beyond a predetermined limit, that is, beyond a trip voltage. Because an increase in beam current will produce an increase in X-radiation for a given high voltage, the high voltage limit for X-radiation safety decreases appreciably with increasing beam current. The protection circuit, being responsive only to high voltage, must therefore be sensitive to a relatively low trip voltage at high beam currents.

Certain television receiver circuits, such as beam limiter circuits, are designed to be responsive to high beam currents. Their function, however, is not to protect against generation of harmful X-radiation, but to protect cathode ray tube components against failure from beam overload conditions due to excess video drive, channel changing induced noise, and momentary arcing between the gun electrodes.

Beam limiters will begin to operate only at relatively large beam currents. The high voltage protection circuit must provide protection at all beam current levels. However, since the protection circuit is only voltage sensitive, its trip voltage changes relatively little with changes in beam current. It is possible for a particular television receiver to operate at low beam currents and at a high voltage which, though not producing any harmful X-radiation, will be greater than the trip voltage of the protection circuit. Normal televison receiver operation will be unnecessarily disabled. It is desirable, therefore, to design a high voltage protection circuit which will eliminate such nuisance tripping.

SUMMARY OF THE INVENTION

A high voltage protection system comprises a deflection winding, a deflection circuit for providing scanning current to the deflection winding, a high voltage circuit for providing a high voltage accelerating potential for beam current, and a beam current sensing circuit for providing a beam current signal representative of the beam current.

A high voltage protection circuit is coupled to the deflection circuit and is responsive to the high voltage accelerating potential for disabling normal deflection circuit operation when the high voltage accelerating potential exceeds first predetermined values. A coupling apparatus is responsive to the beam current signal and couples a signal to the protection circuit when the beam current decreases to less than a given value for changing the magnitudes of the first predetermined values.

DESCRIPTION OF THE INVENTION

Figure 1:
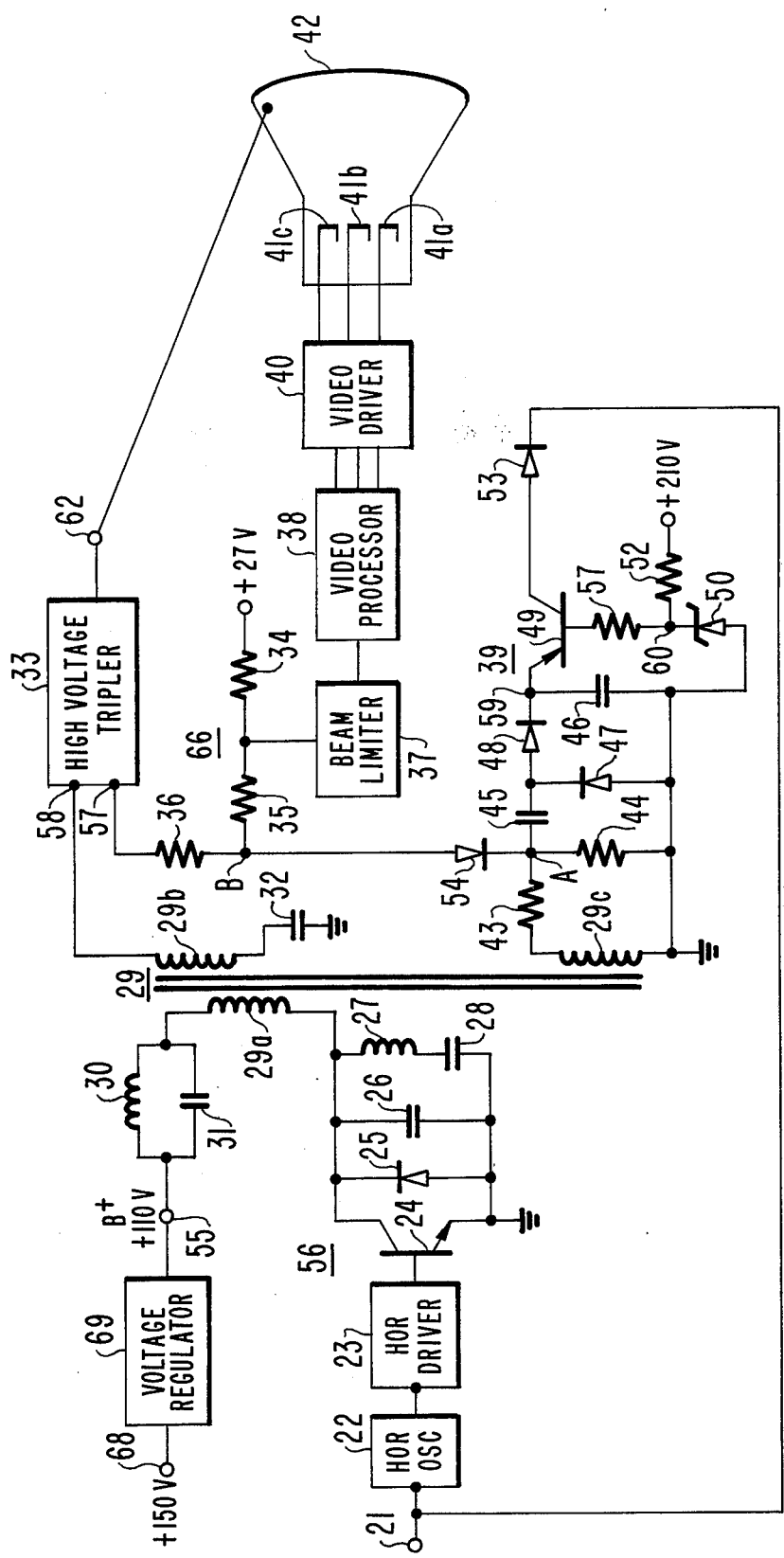
FIG. 1 illustrates a high voltage protection circuit embodying the invention.

In FIG. 1, a source of unregulated voltage at a terminal 68, illustratively +150V DC, is coupled to a voltage regulator 69. The output of voltage regulator 69 at a terminal 55, illustratively +110 volts, is coupled to a high voltage tuning circuit comprising a parallelly coupled inductor 30 and a capacitor 31, then through a primary winding 29a of a horizontal output transformer 29 to a horizontal deflection circuit 56. Horizontal deflection circuit 56 comprises a horizontal oscillator 22, driver 23, horizontal output transistor 24, damper diode 25, retrace capacitor 26, and a series coupled horizontal deflection winding 27 and an "S" shaping capacitor 28 through which horizontal scanning current flows. A control voltage is coupled to an input terminal 21 from an automatic frequency and phase control circuit, not shown, for synchronizing operation of horizontal deflection circuit 56 with incoming horizontal sync pulses.

The trace and retrace voltages developed across primary winding 29a are transformed by a tertiary winding 29b of horizontal output transformer 29 for providing at an ultor terminal 62 a high voltage accelerating potential for beam current in a cathode ray tube 42. The end of tertiary winding 29b is capacitively coupled to ground by a capacitor 32; the other end is coupled to an input terminal 58 of a high voltage tripler 33. The DC path for beam current is coupled to a DC beam current terminal 57 of high voltage tripler 33 from a +27 volt terminal through a beam current sensing circuit 66 comprising series coupled resistances 34–36.

The high voltage at terminal 62 will vary with increasing beam current drawn by cathode ray tube 42. Depending on such factors as the internal impedance exhibited by horizontal output transformer 29 and high voltage tripler 33, and the regulating capability under beam loading of voltage regulator 69, a typical operating curve of high voltage versus beam current for a nominal television receiver is illustrated by curve 67 of FIG. 3. The high voltage decreases with increasing beam current. All television receiver circuits exhibit some variability in their operation, due, for example, to component and assembly tolerances. Thus, some television receivers will exhibit a slightly different operating curve, such as the upper limit operating curve 64 of FIG. 3.

A beam limiter circuit 37 is coupled to the junction of resistors 34 and 35 for limiting the beam current supplied by cathodes 41a, b, c of cathode ray tube should excessive beam current be produced due to arcing between electrodes within the cathode ray tube, excessive video signal drive, etc. Beam limiter circuit 37 operates in a conventional manner, current being drawn from the +27 volt terminal, to supply a beam limiting signal to a video processor circuit 28. A cutoff signal from video processor 38 is coupled to a video driver 40 to cut off the driver output of cathodes 41a, b, c.

A high voltage protection circuit 39, operating indpendently of beam limiter 37, disables normal operation of horizontal deflection circuit 56, should the high voltage at ultor terminal 62 exceed predetermined values — the tripping voltages — thereby preventing generation of harmful X-radiation at the screen of cathode ray tube 42.

A secondary winding 29c is coupled to horizontal output transformer 29. A voltage divider comprising resistors 43 and 44 is coupled across secondary winding 29c. A peak-to-peak detector comprising capacitors 45 and 46 and appropriately poled diodes 47 and 48 is coupled to a terminal A, the junction of resistors 43 and 44. The cathode of a diode 54 is coupled to terminal A; the anode is coupled to a terminal B, the junction of voltage dividing resistors 35 and 36.

The output voltage $V_{59}$ of the peak-to-peak detector at a terminal 59 is coupled to the emitter of a comparator transistor 49. A reference voltage $V_{60}$, obtained at a terminal 60 from a temperature stable reference diode 50, is coupled to the base of transistor 49 through a resistor 51. A +210 volt supply is coupled through a resistor 52 to terminal 60. The collector of transistor 49 is coupled to input terminal 21 of horizontal deflection circuit 56 through a diode 53.

Under fault conditions, such as a failure of voltage regulator 69 to operate properly, the high voltage may increase beyond the safety limit acceptable for given beam current conditions. For a given television receiver type, such a safety limit may be determined from an isoexposure curve of high voltage versus beam current, as illustrated by curve 63 of FIG. 3. Normal operation of the television receiver should be in the region below curve 63. The generation of harmful amounts of X-radiation is a function of both high voltage and beam current. The high voltage safety limit, the isoexposure curve, decreases with increasing beam current since more beam current generates more X-radiation for a given high voltage.

The voltage at terminal 59 is representative of the voltage across secondary winding 29c which, in turn, is representative of the high voltage at terminal 62. Omit for the moment the effect of conduction of diode 54 on the operation of high voltage protection circuit 39. If the high voltage at terminal 62 increases sufficiently to approach the safety limit, the voltage $V_{59}$ also increases, and for high voltages which exceed predetermined values at given beam currents, the voltage $V_{59}$ becomes more than one $V_{be}$ greater than the reference voltage at the base of transistor 49. Transistor 49 conducts, and a disabling voltage is coupled from the collector of transistor 49 to the input terminal 21 of horizontal deflection circuit 56. The disabling voltage greatly increases the frequency of oscillator 22, disabling normal operation of horizontal deflection circuit 56, creating an unviewable raster, and decreasing the high voltage, thereby providing protection against the generation of harmful X-radiation.

Figure 3:
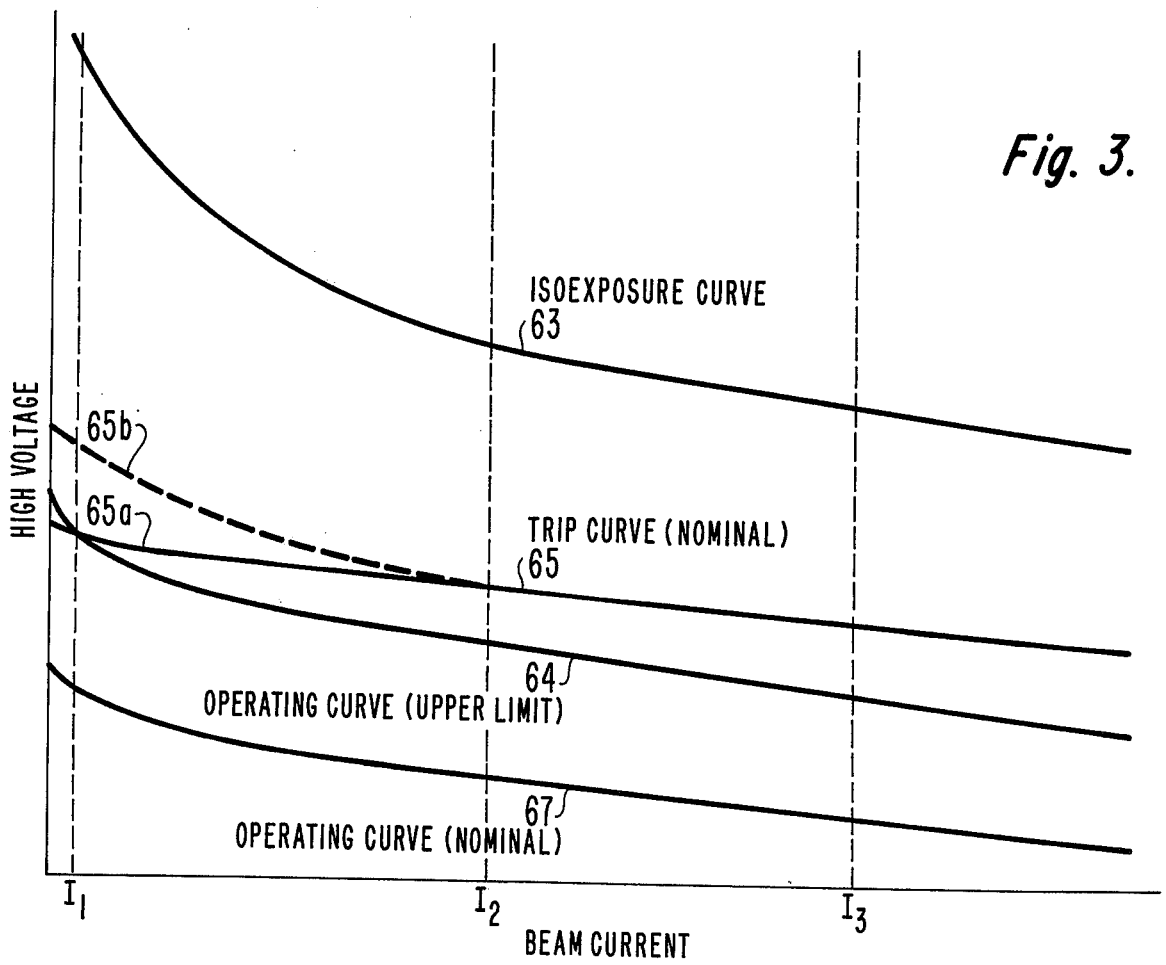

For normal television receiver circuits, the values of the high voltage for given beam currents, the trip voltages, above which high voltage protection 39 disables normal operation of horizontal deflection circuit 56, is illustrated in FIG. 3 by curve 65, and also by curve 65a if conduction of diode 54 is neglected. Disabling will occur well before the generation of harmful X-radiation.

High voltage protection circuit 39 is responsive to the peak-to-peak voltage developed across secondary winding 29c is representative of the high voltage accelerating potential at terminal 62. As the beam current varies at high beam currents, near $I_3$ of FIG. 3, the trip curve 65 and operating curves 64 and 67 are of constant slope. At lower beam currents, near $I_1$ of FIG. 3, the high voltage tends to increase because of, for example, the output impedance of tripler 33 illustrated by increasing slopes for the operating curves 64 and 67 with decreasing beam current. Because the high voltage is sensed by means of the peak-to-peak voltage across secondary winding 29c, the slope of trip curve 65a does not increase as greatly as that of the operating curves.

For some television receivers, for example, those receivers where the tolerances in component manufacture and assembly produce circuits with operating curves near the high limit operating curve 64, the operating curve and trip curve will intersect at low beam currents, near $I_1$ of FIG. 3. For beam currents less than $I_1$, high voltage protection circuit 39 disables normal operation of horizontal deflection circuit 56. This disabling occurs even though the television receiver is being operated in a region well-below isoexposure curve 63, and no harmful X-radiation is being generated.

A feature of the invention is to avoid such nuisance tripping by coupling diode 54 between the junction terminal B of beam current sensing resistors 35 and 36 and terminal A of high voltage protection circuit 39, thereby making high voltage protection circuit 39 also sensitive to beam current variations.

Figure 2A:
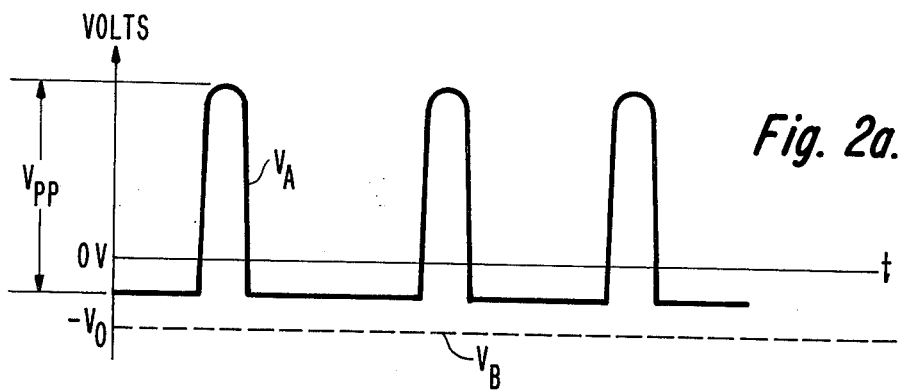
FIGS. 2 and 3 are curves associated with the circuit of FIG. 1.
Figure 2B:
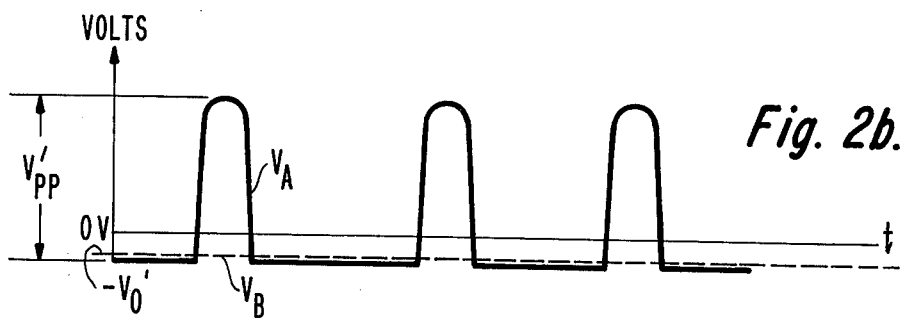

At high beam currents, the voltage $V_A$ at terminal A has a peak-to-peak value of $V_{pp}$, as illustrated in FIG. 2a. The voltage $V_B$ at terminal B is negative and has a value $-V_o$. At the high beam currents, diode 54 is reversed biased for the entirety of each deflection cycle. Beam current sensing resistors are decoupled from high voltage protection circuit 39, and the circuit operates as previously described.

At low beam currents, less than $I_2$ of FIG. 3, the magnitude of the negative voltage $V_B$ at terminal B decreases to a value $-V_o'$. When the voltage $V_A$ at terminal A goes sufficiently negative near the beginning of the trace interval to forward bias diode 54 into conduction, $V_A$ is clamped at a voltage one diode drop more negative than $-V_o'$. Terminal A during the trace interval, is loaded by beam current sensing circuit 66, decreasing the peak-to-peak voltage at terminal A to $V_{pp}'$, which is less than $V_{pp}$ for the high beam current values.

A decrease in the peak-to-peak voltage at terminal A for low beam currents increases the magnitudes of the high voltages required, above which high voltage protection circuit 39 disables normal operation of horizontal deflection circuit 56. The new slope of the trip curve, curve 65b, increases at a sufficiently greater slope at beam currents less than $I_2$ that even the upper limit operating curves such as curve 64 will not intersect the trip curve. Disabling of normal television receiver operation will not occur. It should be understood that nuisance tripping may also be caused by differences in the values of trip curves 65 and 65a from one receiver to another due to such factors as component tolerances and assembly. Thus, with high voltage protection circuit 39 sufficiently responsive to both high voltage and beam current nuisance tripping is eliminated.

What is claimed is:

1. High voltage protection apparatus for a display system comprising:

a high voltage transformer responsive to a first alternating voltage for providing a high voltage accelerating potential for beam current;

a first winding coupled to said high voltage transformer for providing a second alternating voltage representative of said high voltage accelerating potential;

a protection circuit coupled to said first winding and responsive to said second alternating voltage for providing a disabling signal for disabling normal operation of said display system when said high voltage accelerating potential exceeds first predetermined values;

beam current sensing means responsive to said beam current for providing at a first terminal a first voltage representative of the magnitude of said beam current; and first means coupled to said first terminal and said first winding for clamping a winding terminal of said first winding to said first voltage during at least a portion of an interval of said second alternating voltage when said beam current equals or goes beyond a predetermined amount for changing the magnitudes of said first predetermined values.

2. A circuit according to claim 1 wherein said first means comprises a diode poled to conduct when said beam current equals or goes beyond said predetermined amount.

3. A circuit according to claim 1 wherein said beam current sensing means comprises a voltage divider through which said beam current flows, said first means coupled to a junction of said voltage divider.

4. A circuit according to claim 1 including a deflection circuit coupled to said high voltage transformer.

5. A circuit according to claim 4 wherein said first means loads said winding terminal during at least a portion of each deflection cycle for changing the magnitudes of said first predetermined values.

6. A circuit according to claim 5 wherein said high voltage transformer includes a tertiary winding magnetically coupled to a primary winding of said high voltage transformer.

7. A circuit according to claim 5 wherein said high voltage transformer is coupled to a high voltage tripler for providing said high voltage accelerating potential at an output terminal of said high voltage tripler.

8. A circuit according to claim 7 wherein said beam current sensing means is coupled to a DC beam current input terminal of said high voltage tripler.

9. A circuit according to claim 8 wherein said beam current sensing means comprises a voltage divider through which said beam current flows, said first means coupled to a junction of said voltage divider.

10. A circuit according to claim 1 wherein said protection circuit includes:

second means coupled to said first winding for detecting a peak excursion of said second alternating voltage;

a comparator coupled to an output terminal of said second means and to a source of reference voltage for providing said disabling signal; and means for coupling said disabling signal to said deflection circuit for disabling normal operation of said display system.

11. A high voltage protection system for a television receiver comprising:

a deflection winding;

a deflection circuit coupled to said deflection winding for providing scanning current to said deflection winding;

high voltage means including an output transformer coupled to said deflection circuit for providing a high voltage accelerating potential for beam current;

a secondary winding coupled to said output transformer for providing a first signal representative of said high voltage accelerating potential at a first terminal;

beam current sensing means responsive to said beam current for providing a beam current signal representative of said beam current;

a protection circuit responsive to said first signal for providing a disabling signal for disabling normal operation of said television receiver when said high voltage accelerating potential exceeds first predetermined values; and first means coupled to said secondary winding and responsive to said beam current signal for loading said first terminal during at least a portion of each deflection cycle when said beam current decreases to less than a second predetermined value for changing the magnitudes of said first predetermined values.

* * * * *